G. H. CURTISS.
AIRPLANE FITTING.
APPLICATION FILED JAN. 29, 1917.

1,363,844.

Patented Dec. 28, 1920.

Inventor
GLENN H. CURTISS.

Attorney

UNITED STATES PATENT OFFICE.

GLENN H. CURTISS, OF BUFFALO, NEW YORK, ASSIGNOR TO CURTISS AEROPLANE & MOTOR CORPORATION, A CORPORATION OF NEW YORK.

AIRPLANE-FITTING.

1,363,844.  Specification of Letters Patent.  Patented Dec. 28, 1920.

Original application filed August 22, 1911, Serial No. 645,340. Divided and this application filed January 29, 1917. Serial No. 145,139.

*To all whom it may concern:*

Be it known that I, GLENN H. CURTISS, a citizen of the United States, residing at Buffalo, in the county of Erie and State of New York, have invented certain new and useful Improvements in Airplane-Fittings, of which the following is a specification.

My invention relates to heavier-than-air flying machines and has reference more particularly to improvements in airplane fittings.

In an application filed by me August 22, 1911, S. N. 645,340, of which this is a division, there is described and illustrated a wing structure including in its ensemble a plurality of superposed supporting surfaces or planes and a plurality of similar panels. The wing beams of the several surfaces or panels are equipped with appropriate sockets especially constructed to permit quick assembly and an enlargement of the surface area by the addition of one or more surfaces or panels. These sockets terminally receive the wing posts and constitute anchorages for the wiring of the wing structure. In all respects the structure herein described and claimed is a counterpart of the structure originally disclosed.

In order to provide a construction of the supporting surfaces 10 which will allow the wing structure to be inexpensively and easily set up and taken down, I prefer to build said surfaces of similar panels, the panels, in a biplane, consisting of two supporting, and in a triplane, of three supporting surfaces; the supporting surfaces in each instance being co-extensive.

Figure 1:
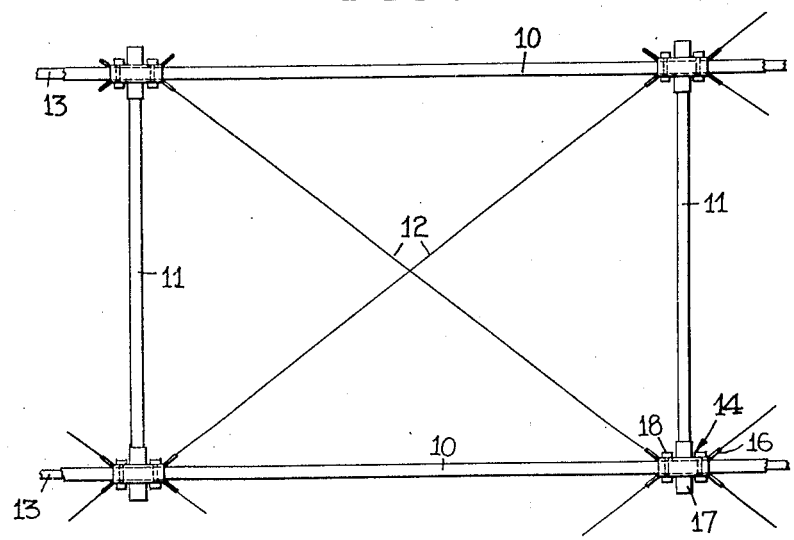
Figure 1 is a front elevation of a portion of the superposed surfaces.
Figure 2:
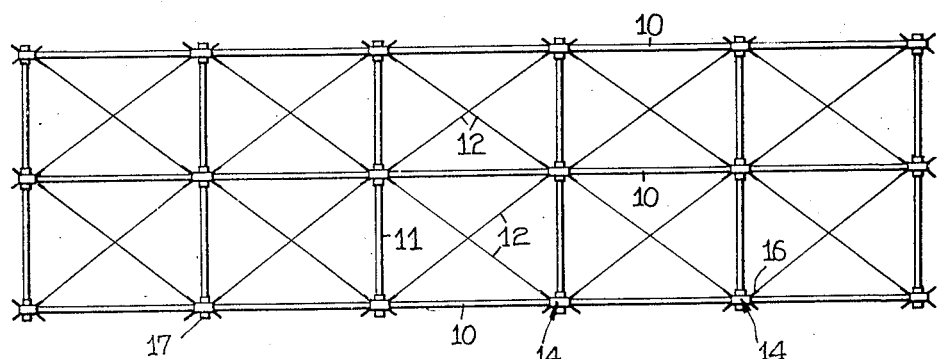
Fig. 2 is a front elevation of a wing structure including three superposed surfaces.

Wing posts 11 interconnect and with cross arranged wires 12 truss the wing structure throughout. These posts, in a triplane or multiplane, are preferably vertically alined and so arranged and founded upon the wing or panel beams 13 of the wing structure as to interconnect respectively corresponding beams of superposed planes. The length of the panels can be varied as desired and the number of planes multiplied by superposing one above the other. If it is desired to make a wing structure of three or more superposed surfaces, or to add or omit any desired panels, it is very easy to do so. For example, as shown in Fig. 2, an additional surface has been added above the two surfaces of a biplane wing structure by adding five similar panels with sockets, posts and trussing wires. With such construction, the wing structure may be easily assembled and knocked down. Moreover, constructional cost is materially reduced.

Figure 3:
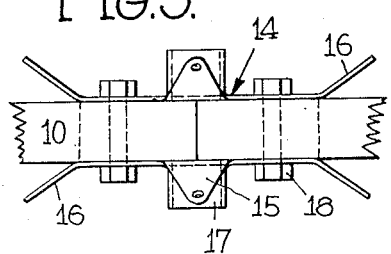
Figs. 3 and 4 are rear and side elevations of a socket.
Figure 4:
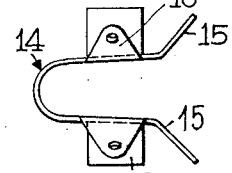

The sockets above referred to (detailed in Figs. 3 and 4) are constructed of metal bent into a substantial U-shape. The beams 13 of the respective panels are slid laterally into the sockets and fastened by passing bolts through said sockets and beams. The complete socket I have designated in its entirety by the numeral 14. After bending the metal into a substantial U-shape as indicated in Fig. 4, the terminals are angularly extended as indicated at 15. These angularly extended terminal portions together with similarly bent ears 16 afford anchorages for the cross-arranged or trussing wires 12. Wing post terminal sockets 17 are formed integrally upon the metal socket plate to open oppositely and in assembly engage with the terminals of separate but alined posts. The bolts for fastening the sockets 14 in place have been designated 18.

By constructing the anchorage for the wires 12 as an integral part of the wing post sockets 14, the number of wing structure parts is reduced and assembly very much facilitated. If used in connection with a triplane or multiplane, the sockets of the intermediate plane or planes function as anchorages for alined but opposed posts, consequently lessening the number of ordinarily required fittings by half. The said sockets further provide in effect a clamp for the wing beam terminals of the respective panels added to the wing structure as a whole. If additional panels are to be provided in the same horizontal plane as the other panels, said additional panels should be slid into the open ends of the sockets and similarly fastened and trussed.

Although essentially a wing post socket, the fitting 14, by very light modification, might adapt itself to other uses, without departing from the spirit of the invention as herein disclosed. Especially is this true in truss-work wherein rigid compression members can be advantageously socketed and the tie-wires anchored to the angularly bent ears of the fitting.

What is claimed is:

1. As an article of manufacture, an airplane fitting comprising a body portion fashioned to partially embrace an element of the airplane, said body portion being provided with integral angular sockets within which other and different elements of the airplane are seated.

2. As an article of manufacture, an airplane fitting comprising a one piece sheet metal body portion adapted to be bent around and to snugly embrace an element of the airplane, said body portion being provided with integral sockets within which other and different elements of the airplane are seated.

3. As an article of manufacture, an airplane fitting comprising a body portion fashioned to partially embrace an element of the airplane, said body portion being provided with ears for the attachment of brace wires, the ears being integrally formed upon the ends of the body portion and upon the edges of the body portion to extend, in each instance, out from the body portion at an angle.

4. As an article of manufacture, an airplane fitting comprising a one piece sheet metal body portion adapted to be bent around and to snugly embrace an element of the airplane, said body portion being provided with ears for the attachment of brace wires, the ears being integrally formed upon the ends of the body portion and upon the edges of the body portion to extend out from the body portion at an angle.

5. As an article of manufacture, an airplane fitting comprising a one piece sheet metal body portion adapted to be bent around and to snugly embrace an element of the airplane, the body portion being provided with bent up ears for the attachment of brace wires, the ears being formed upon the ends of the body portion and upon the edges of the body portion to extend, in each instance, out from the body portion at an angle and sockets integrally formed upon said body portion within which elements of the airplane other than the element embraced by the body portion are seated.

In testimony whereof I affix my signature.

GLENN H. CURTISS.